United States Patent
Norrell et al.

[15] 3,698,489
[45] Oct. 17, 1972

[54] TOOL BAR CONSTRUCTION

[72] Inventors: Arvin L. Norrell, P.O. Box North Avenue North; Arvin W. Norrell, P.O. Box 135 925 Avenue Q, both of Sunray, Tex. 79086

[22] Filed: Sept. 10, 1969

[21] Appl. No.: 856,642

[52] U.S. Cl.............................172/656, 172/689;776
[51] Int. Cl.................................................A01b 23/04
[58] Field of Search......172/451, 634, 641, 645, 620, 172/656, 689, 694, 697, 698, 654, 776; 52/637, 648, 654

[56] References Cited

UNITED STATES PATENTS

| | | | |
|---|---|---|---|
| 3,312,290 | 4/1967 | Abbott | 172/451 |
| 767,533 | 8/1904 | Warner | 52/654 |
| 1,174,501 | 3/1916 | Hughes et al. | 52/654 |
| 2,409,060 | 10/1946 | Moore | 52/648 |
| 2,530,565 | 11/1950 | Briscoe | 172/451 |
| 2,784,658 | 3/1957 | Hodges | 172/451 |
| 2,806,560 | 9/1957 | Cox | 52/637 |
| 3,001,590 | 9/1961 | Tsuchiya | 172/451 |
| 3,330,364 | 7/1967 | Orthman | 172/451 |
| 3,403,737 | 10/1968 | Byrd | 172/451 |

FOREIGN PATENTS OR APPLICATIONS

| | | | |
|---|---|---|---|
| 1,263,311 | 12/1961 | France | 52/637 |

*Primary Examiner*—Robert E. Pulfrey
*Assistant Examiner*—C. W. Hanor
*Attorney*—Clarence A. O'Brien and Harvey B. Jacobson

[57] ABSTRACT

A tool bar unit comprising three parallel tool bars and a series of triangular spacers positioning the bars at approximately equal distances in a triangular pattern whereby two of the tool bars are in the same horizontal plane and act as the mounting tool bars, while the third tool bar is located centrally between the first two tool bars and in a horizontal plane vertically thereabove so as to cooperate with the triangular spacers and define stiffening means. The spacers each consists of a pair of solid plates sandwiching edge reinforcing rods therebetween, the opposed ends of the rods being threaded and orientated so as to define tool bar receiving and clamp mounting members.

5 Claims, 4 Drawing Figures

PATENTED OCT 17 1972 3,698,489

Arvin L. Norrell
Arvin W. Norrell
INVENTORS

BY Clarence A. O'Brien
and Harvey B. Jacobson
Attorneys

Arvin L. Norrell
Arvin W. Norrell
INVENTORS

TOOL BAR CONSTRUCTION

The invention herein is generally directed to tool bar construction, and more particularly relates to a tool bar unit comprising three tool bars, and a unique combination spacer and brace for rigidly interconnecting the three tool bars.

It is a primary object of the instant invention to provide both a unique arrangement of tool bars in a multi-bar unit, and a unique spacer for orientating and interlocking the multiple bars.

A problem frequently arising in connection with implement mounting tool bars is the tendency for such bars to sag or sway, especially when bars of a substantial length are utilized. As will be appreciated, because of this tendency, tool bar lengths are limited, or alternatively require elaborate bracing construction in the absence of which an irregular working of the ground by the mounted tools will result. Thus, it is a significant object of the instant invention to provide a tool bar unit wherein any tendency for the unit, and particularly the two working tool bars associated therewith, to sway, sag or become misaligned is substantially eliminated.

Further, an important object of the instant invention resides in the provision of a three bar unit which incorporates highly unique spacers capable of rigidly interconnecting the three bars into a stable unit, the three bars being arranged so as to define a unit which in cross-section assumes the general shape of an equilateral triangle.

In addition, it is a significant object of the instant invention to provide a tool bar spacer which is in effect a single unit engageable with and between the three bars which in turn are fixedly clamped thereto utilizing three notched tool bar clamps.

Although multi-bar units have heretofore been devised, the known units, while providing additional bars for the mounting of a variety of tools, do not to any great degree eliminate undesirable sagging or lateral swaying such as is achieved by the instant invention through both a unique arrangement of the multiple tool bars and a uniquely constructed series of spacers. Basically, the objects of the instant invention are achieved through the provision of a tool bar unit wherein three tool bars are arranged so as to, in cross-section, define approximately an equilateral triangle. The spacers utilized each consists of a pair of triangular plates, the edges of which are reinforced by elongated rods sandwiched between the plates. These rods in turn have the outer ends thereof outturned so as to define three mounting ends within which the tool bars are received and subsequently clamped by appropriate tool bar clamps secured to the outer ends of the rods over the received bars.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
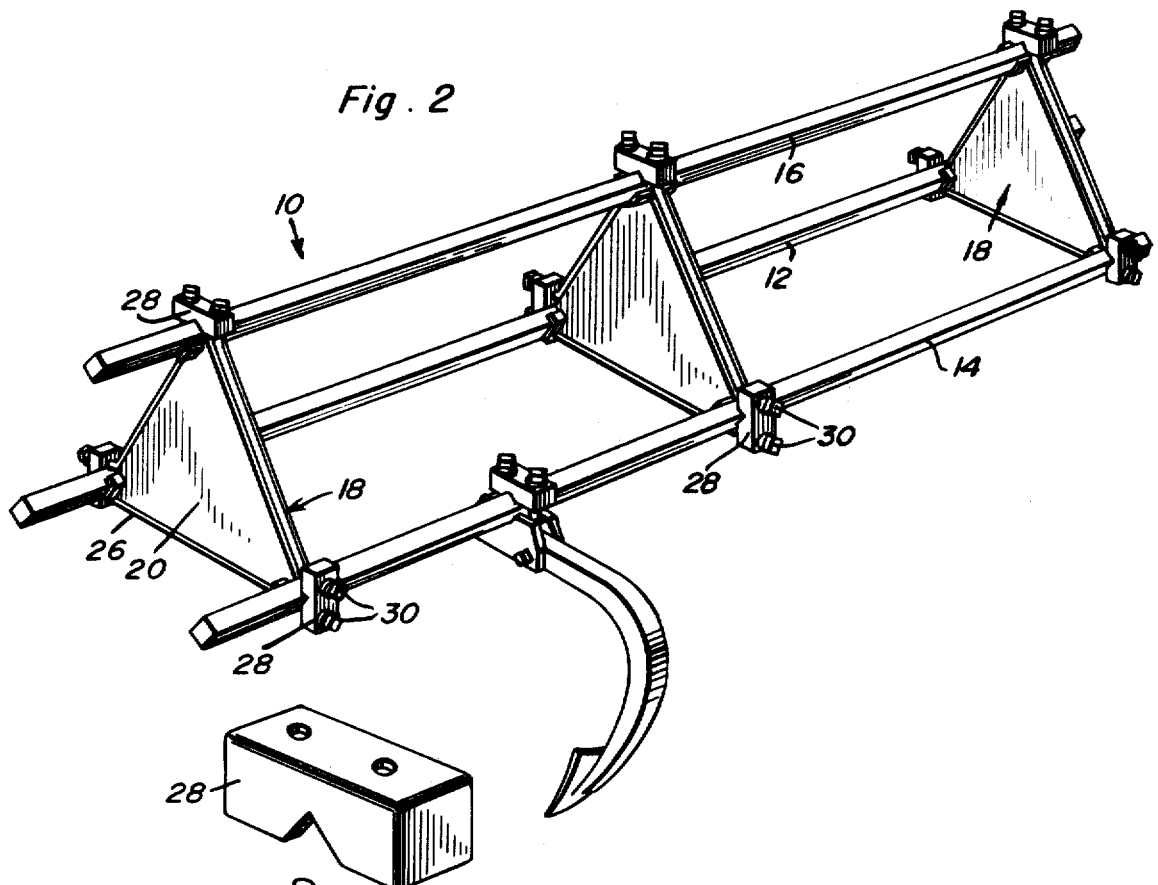
FIG. 2 is an enlarged perspective detail of the tool bar construction.

Referring now more specifically to the drawings, reference numeral 10 is used to designate the tool bar construction or tool bar unit of the instant invention. This unit 10 incorporates three tool bars 12, 14 and 16, the bars 12 and 14 constituting the forward and rear working tool bars, while the bar 16 is utilized as a stiffener. As will be appreciate from FIG. 2, the working bars 12 and 14 are in a common horizontal plane, while the bar 16 is located centrally therebetween and vertically thereabove, the three bars being spaced approximately equal distances from each other in a generally equilateral triangular pattern.

Figure 1:
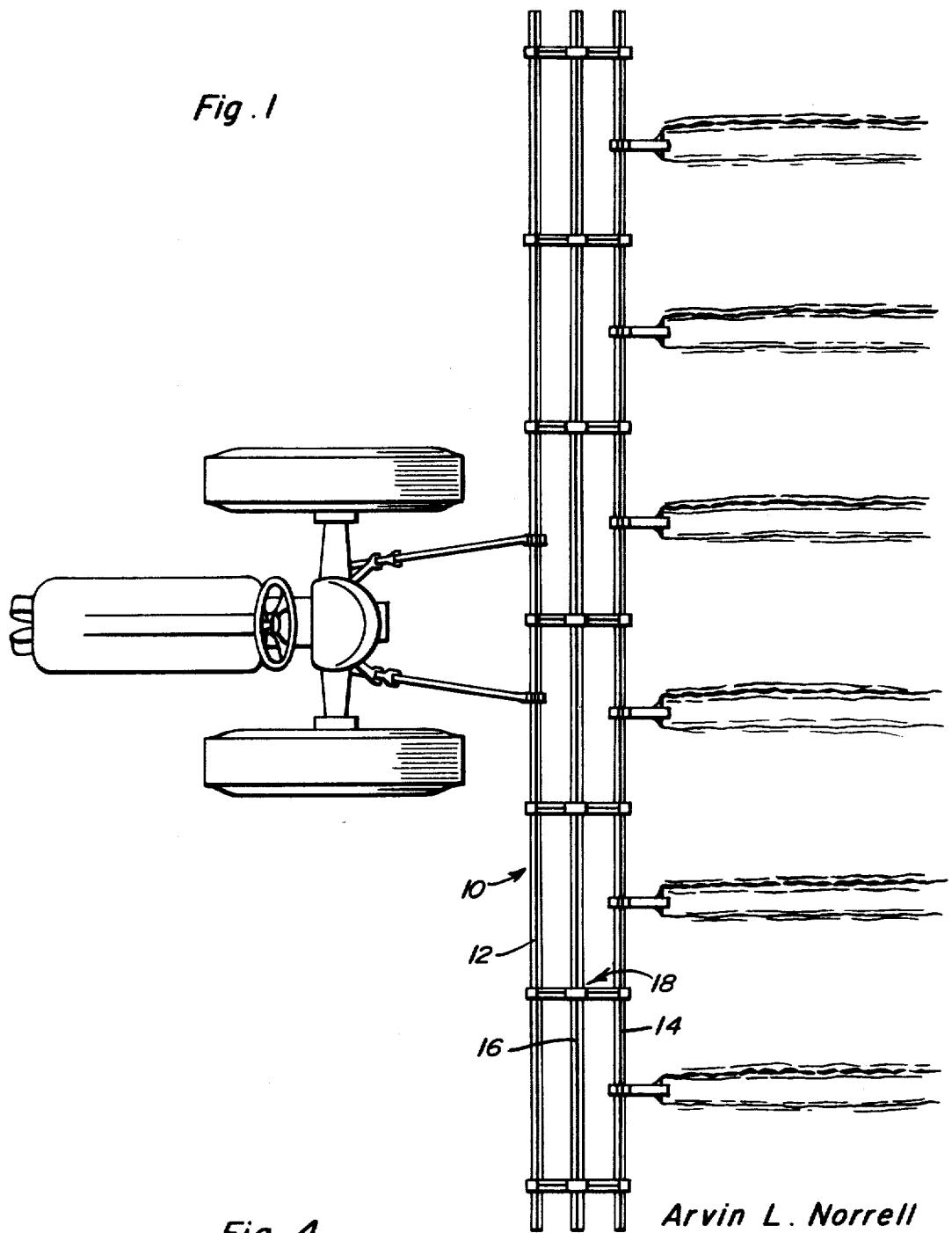
FIG. 1 is a plan view of a tool bar unit constructed in accordance with the instant invention and mounted in operative position on a farm tractor.
Figure 4:
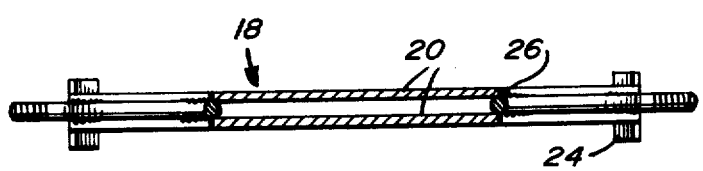
FIG. 4 is a cross-sectional view taken substantially on a plane passing along line 4—4 in FIG. 3.
Figure 3:
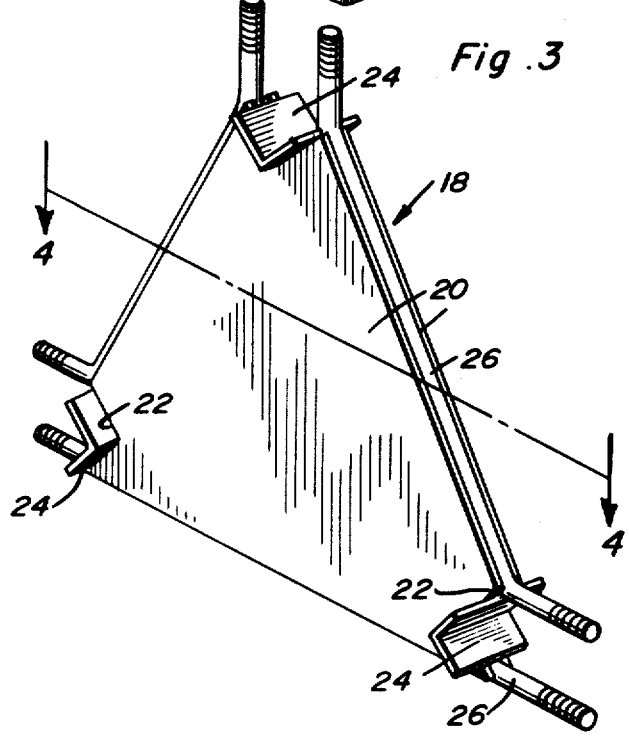
FIG. 3 is an enlarged perspective view of one of the tool bar spacers.

The tool bar unit 10 also includes a series of highly unique bar spacers 18. Each spacer 18, noting FIGS. 3 and 4 in particular, includes a pair of laterally spaced parallel triangular plates 20, the corners of which have right angular notches 22 defined therein. Each aligned pair of notches 22 in turn receives a relatively short outwardly facing angle bar 24 which is welded to the two plates 20 and defines a bar seat for one of the tool bars. As will be noted, these angle bar seats 24 project laterally beyond both plates 20 so as to provide a seat slightly wider than the width of the spaced plates 20.

The two solid plates 20 of each spacer 18 have the edges thereof reinforced by elongated rods 26 sandwiched therebetween and welded thereto, the opposite end portions of the rods 26 being externally threaded so as to in effect define mounting bolts. The three corners of each generally equilateral triangularly shaped spacer 18 have the corresponding rod end portions projecting outwardly parallel to each other and to the opposite sides of the corresponding angle bar seats 24. Each tool bar, 12, 14 or 16, is received between a pair of rod ends and seated on the corresponding angle bar 24 against which it is firmly clamped by an appropriate notched clamping block 28 received over the threaded outer ends of the pair of rod end portions and locked thereon by a pair of locknuts 30. The provision of a series of such spacers 18 along the length of the three bars 12, 14 and 16 result in a highly rigid integral unit incorporating two horizontally coplanar tool mounting bars 12 and 14 and a single centrally located elevated stiffener bar 16. The central location of the stiffener bar 16 and the generally equilateral arrangement of the three bars is considered particularly significant in precluding substantially any tendency for the unit to sway or sag. Likewise, the use of single solid spacers interconnecting all three bars greatly contributes to both the rigidity of the unit and the ease of assembly thereof, the interconnected bars, and in particular the two work tool mounting bars 12 and 14, being properly positioned and exposed for easy access thereto in both mounting the unit on a towing vehicle, such as the illustrated tractor, and a mounting of the working tools.

From the foregoing, it will be appreciated that a highly unique tool bar spacer has been defined whereby a novel tool bar unit, consisting of three approximately equally spaced tool bars, can be constructed. The spacer itself is generally in the shape of an equilateral triangle and consists of a pair of solid laterally spaced parallel plates edge reinforced by elongated rods. The rods have the opposite end portions thereof outwardly directed at the corresponding corners of the plates with two such rod ends being located in laterally spaced parallel relation to each other at each corner for the accommodation of a tool bar therebetween. The plate corners themselves are notched and mount a right angular seating member for the seated reception of the corresponding bar which is to be clamped thereagainst by an appropriate bar clamp mounted over the projecting ends of the associated pair of rods. The triangular spacer 18 is orientated with a horizontal base edge and two upwardly converging side edges. The rod which follows the base edge has coaxial end portions and the two rods which parallel the upwardly inclined edges have lower edge portions outwardly angled so as to extend horizontally and upper edge portions upwardly angled so as to extend vertically. The tool bar unit constructed utilizing the spacers is highly rigid and resistant to both undesirable swaying and sagging, a problem heretofore constituting a major source of difficulty in providing tool bars of any substantial length.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool bar unit comprising three elongated tool bars, said bars being in laterally spaced parallel relation to each other, two of said bars being orientated in a common horizontal plane, the third of said bars being located centrally between the two bars and vertically above the horizontal plane so as to define a triangular orientation for the bars, and spacer means fixing the bars relative to each other, said spacer means comprising a plurality of spacers, each spacer comprising an integral triangular unit including three bar mounting portions, each bar mounting portion comprising a transversely orientated bar seat, and a bar clamp releasably mountable over each bar seat and a seat received bar, each bar mounting portion being defined at a corner of the triangular spacer unit, each spacer being formed of a pair of laterally spaced parallel plates, and means rigidly interconnecting said plates, the means interconnecting the spacer plates comprising edge reinforcing rods sandwiched between said plates along the edges thereof, said rods each having outwardly directed end portions defining a pair of parallel outwardly directed rod end portions at each spacer bar mounting portion for reception of a bar therebetween and the associated bar clamp thereon.

2. The construction of claim 1 wherein each transverse bar seat includes an angle member fixed to and extending across said plates.

3. The construction of claim 2 wherein each spacer is substantially equilateral in shape.

4. For use in combining three elongated parallel tool bars into a single multiple tool bar unit, a tool bar spacer, said spacer being triangular in configuration and including three bar mounting portions, each bar mounting portion comprising a transverse bar seat for the seated reception of a tool bar therein, and associated releasable clamp mounting means with each seat for the retention of a bar therein, each bar mounting portion being defined at a corner of the triangular spacer, each spacer comprising a pair of laterally spaced parallel plates, and means rigidly interconnecting said plates, the means interconnecting the spacer plates comprising edge reinforcing rods sandwiched between said plates along the edges thereof, said rods each having outwardly directed end portions defining a pair of parallel outwardly directed rod end portions at each spacer bar mounting portion for reception of a bar therebetween and the associated bar clamp thereon.

5. The construction of claim 4 wherein each transverse bar seat is defined by an angle member fixed to and extending across said plates between a pair of adjoining rod end portions.

* * * * *